(12) United States Patent
Niederriter et al.

(10) Patent No.: US 7,005,576 B2
(45) Date of Patent: Feb. 28, 2006

(54) PERMISSIBLE CONTROLLER COVER RESISTANT TO FASTENER BREAKAGE

(75) Inventors: Edward F. Niederriter, Fryburg, PA (US); Robert P. Aaron, Jr., Marble, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 10/889,195

(22) Filed: Jul. 12, 2004

(65) Prior Publication Data

US 2006/0005982 A1    Jan. 12, 2006

(51) Int. Cl.
H02G 3/08    (2006.01)

(52) U.S. Cl. .............................. 174/50; 174/66; 174/67; 220/3.2; 220/241; 220/242; 439/535; 439/536

(58) Field of Classification Search ................. 174/50, 174/53, 57, 58, 17 R, 52.1, 48, 65 R, 66; 220/3.2, 3.3, 3.4, 3.5, 3.6, 3.7, 3.8, 4.02, 220/241, 242; 439/76.2, 535, 536, 537, 949; 361/600, 601, 602, 616, 641, 724; 385/134, 385/135

See application file for complete search history.

(56) References Cited

U.S. PATENT DOCUMENTS

| | | | |
|---|---|---|---|
| 3,775,551 A | 11/1973 | Prehmus et al. .......... 174/52 R |
| 3,910,448 A | 10/1975 | Evans et al. ................. 220/3.8 |
| 4,094,361 A | 6/1978 | Yago .......................... 169/48 |
| 4,620,061 A | 10/1986 | Appleton ..................... 174/51 |
| 4,664,281 A * | 5/1987 | Falk et al. ................... 220/3.8 |
| 4,721,227 A | 1/1988 | Hughes et al. .............. 220/429 |
| 4,767,901 A | 8/1988 | Goyarts ...................... 200/306 |
| 4,796,159 A | 1/1989 | Miksche ..................... 361/429 |
| 5,043,853 A | 8/1991 | Rutledge .................... 362/222 |
| 5,061,022 A | 10/1991 | Meriwether ................ 312/324 |
| 5,310,963 A | 5/1994 | Kennelly ..................... 174/65 |
| 5,534,664 A * | 7/1996 | Fearing et al. ................ 174/50 |
| 5,621,189 A | 4/1997 | Dodds .......................... 174/50 |
| 5,826,707 A * | 10/1998 | Williams .................... 220/3.2 |
| 5,845,803 A * | 12/1998 | Saito et al. .................. 220/241 |
| 5,942,728 A * | 8/1999 | Chen ......................... 174/65 R |
| 6,007,157 A | 12/1999 | Stewart ....................... 299/10 |
| 6,040,526 A | 3/2000 | Olzak ........................ 174/52.1 |
| 6,107,567 A * | 8/2000 | Blalock ........................ 174/58 |
| 6,286,373 B1 | 9/2001 | Lister et al. ........... 73/861.355 |
| 6,362,951 B1 * | 3/2002 | Moribe et al. .............. 361/600 |
| 6,425,211 B1 | 7/2002 | Wise et al. ....................... 52/1 |
| D462,329 S | 9/2002 | Hughes et al. ............. D13/152 |
| 6,527,302 B1 * | 3/2003 | Gault et al. .................... 174/50 |
| 6,541,699 B1 * | 4/2003 | Lindemulder et al. ........ 174/50 |

(Continued)

Primary Examiner—Angel R. Estrada
(74) Attorney, Agent, or Firm—James Earl Lowe, Jr.

(57) ABSTRACT

An assembly includes a structural member or frame that supports a load. The frame has a rectangular opening therein to a cavity within the frame that is adapted to house electrical components therein. There are a plurality of opening screw holes in the frame and spaced apart completely around and outside of the opening. The mining apparatus also includes a cover for the opening, the cover including a plate with an area larger than the opening, the plate having a first surface and an opposite second surface. The cover also includes a lip protruding from the second surface, the lip extending over and around and enclosing an area of the second surface and defining a protrusion that, when the cover is laid over the opening, fits closely within the opening.

3 Claims, 4 Drawing Sheets

U.S. PATENT DOCUMENTS

| | | | |
|---|---|---|---|
| 6,565,162 B1 | 5/2003 | Stewart | 305/153 |
| 6,635,821 B1 * | 10/2003 | Loeffelholz et al. | 174/53 |
| 6,798,966 B1 * | 9/2004 | Loh | 385/134 |
| 6,899,240 B1 * | 5/2005 | Dang et al. | 220/3.8 |

* cited by examiner

PERMISSIBLE CONTROLLER COVER RESISTANT TO FASTENER BREAKAGE

BACKGROUND OF THE INVENTION

The present invention relates to an assembly including a structural member or frame that supports a load, and more particularly, to electro-hydraulic control systems for mineral mining installations.

Underground mining machines are usually powered using electricity and electric motors. In order to house the controls for these motors, a controller case is employed. A controller case for use in a gaseous mine environment must be certified explosion proof and this is accomplished by constructing it as a robust box made from steel with a finely machined cover which is screwed onto a machined flange.

This fit of the cover to the flange is known as the flame path. It must adhere to strict specifications in order to be effective at preventing an explosion from occurring when there are flammable gases outside the controller. These covers usually employ a number of closely spaced cap screws securing them to the controller case.

When mining machines are used in low seams, the size of the controller must be minimized. In some cases it is advantageous to make the controller case a structural member of the machine frame in order to maximize the internal volume of the controller while minimizing the size of the machine. In other words, the controller box is not installed in a space in the frame; it becomes the frame. Another common characteristic of a mining controller is the use of a cover that is substantially one entire side of the case. This is done to allow generous access to install the components in the case initially as well as troubleshooting after the machine has been put into production.

When the controller is a structural member of the machine, the stresses exerted on the controller case can cause the screws that mount the covers to loosen or fracture, but these controllers are required to be explosion proof in order to prevent an internal electrical spark from igniting a gaseous mine atmosphere.

SUMMARY OF THE INVENTION

One of the principal objects of the invention is to provide a solution to the problem of screw failure. This invention provides a cover design that vastly improves the rigidity of the controller when the cover is installed.

More particularly, this invention provides an assembly including a structural member or frame that supports a load. The frame has a rectangular opening therein to a cavity within the frame that is adapted to house electrical components therein. There are a plurality of opening screw holes in the frame and spaced apart completely around and outside of the opening. The mining apparatus also includes a cover for the opening, the cover including a plate with an area larger than the opening, the plate having a first surface and an opposite second surface. The cover also includes a lip protruding from the second surface, the lip extending over and around and enclosing an area of the second surface and defining a protrusion that, when the cover is laid over the opening, fits closely within the opening. The cover also includes a plurality of plate screw holes, in the plate and spaced apart completely around and outside of the opening when the cover is laid over the opening. The mining apparatus also includes a plurality of screws, with each screw received in a respective one of the plate screw holes and received in a respective one of the member screw holes so that the head of the screw is on the first surface of the plate.

Figure 1:
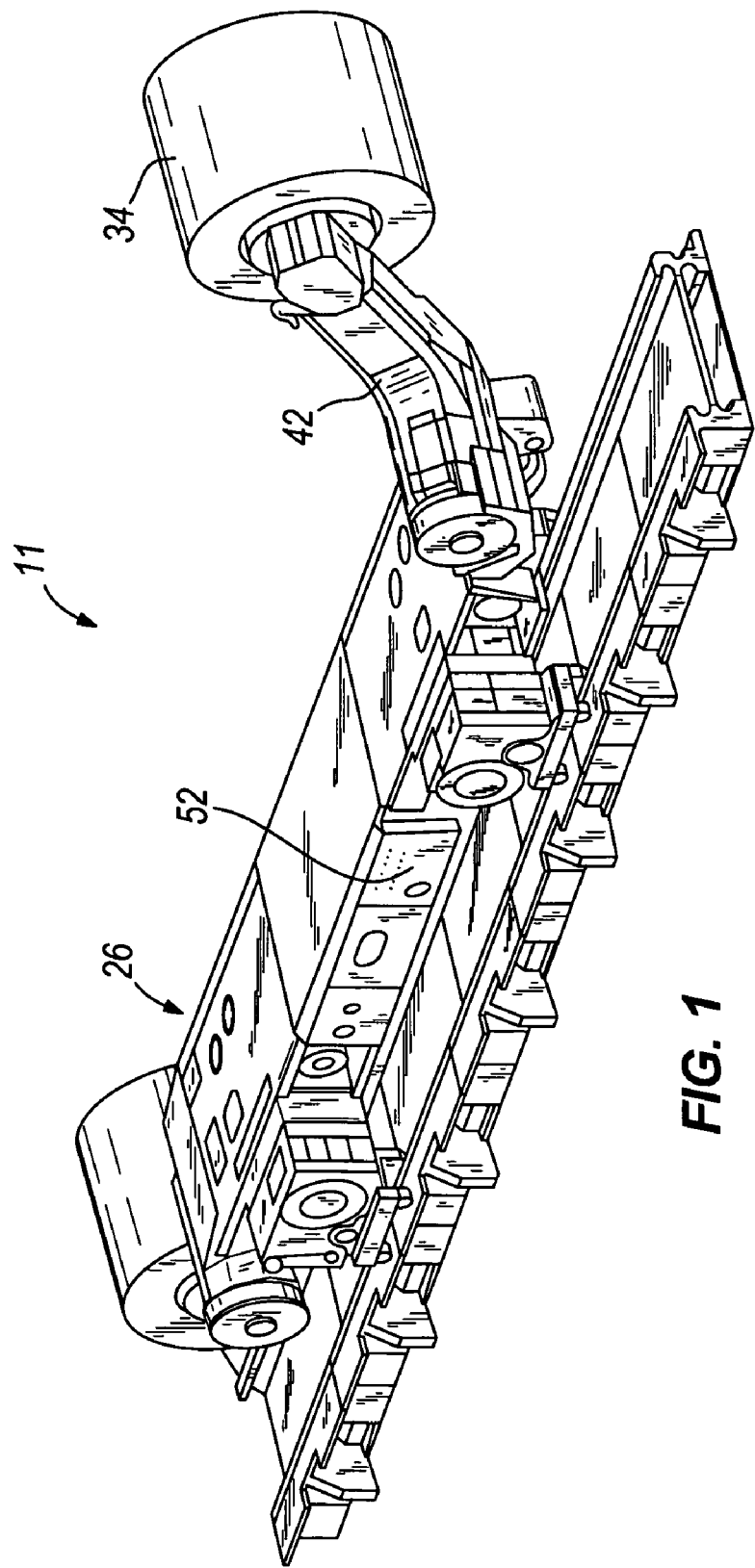
FIG. 1 is a perspective view of a longwall shearer including the structural member or controller of this invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

Figure 2:
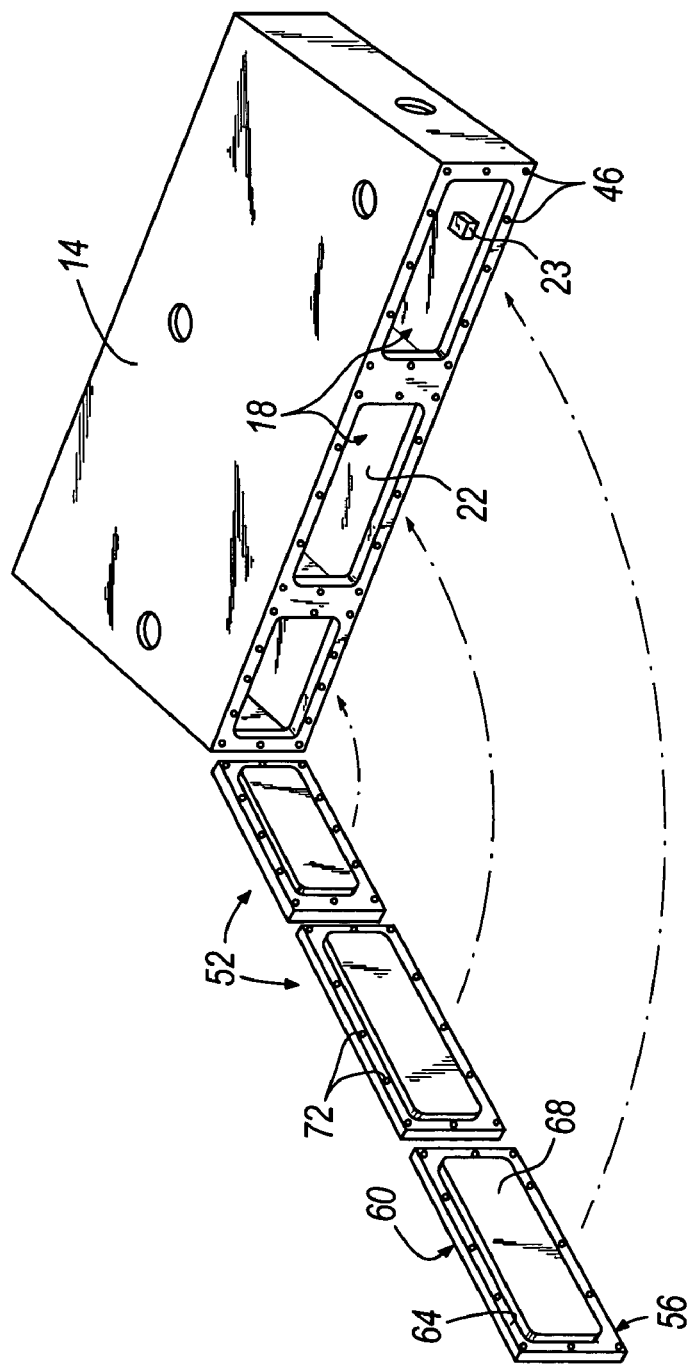
FIG. 2 is a rear perspective view of the unassembled controller and covers.
Figure 3:
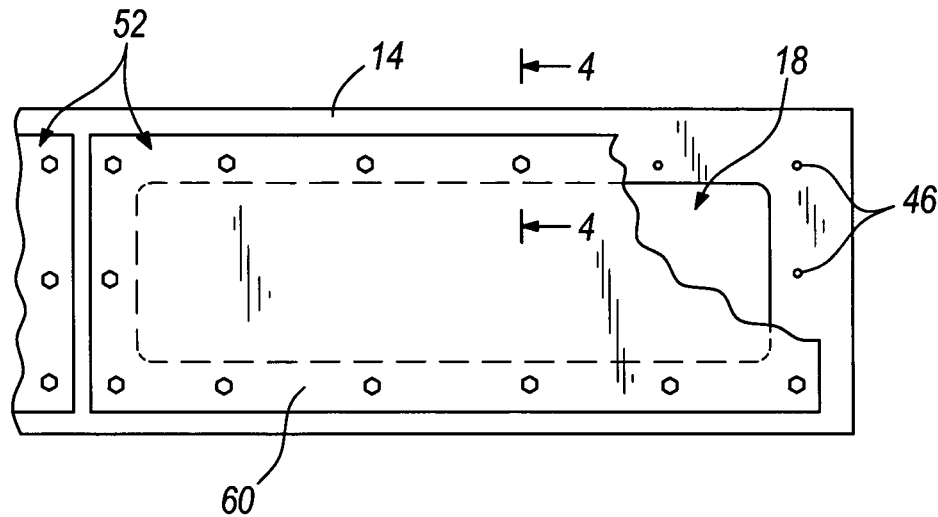
FIG. 3 is a front view, partially broken away, of the assembled controller and covers.
Figure 4:
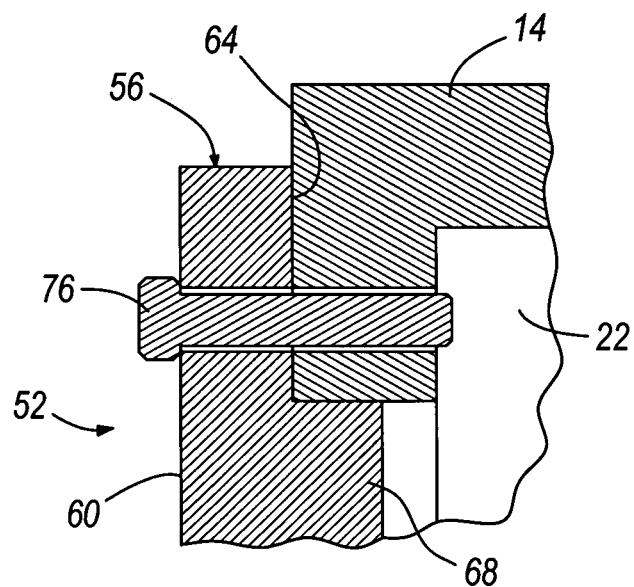
FIG. 4 is a partially enlarged view of the assembled controller and covers taken along the line 4—4 in FIG. 3.
Figure 5:
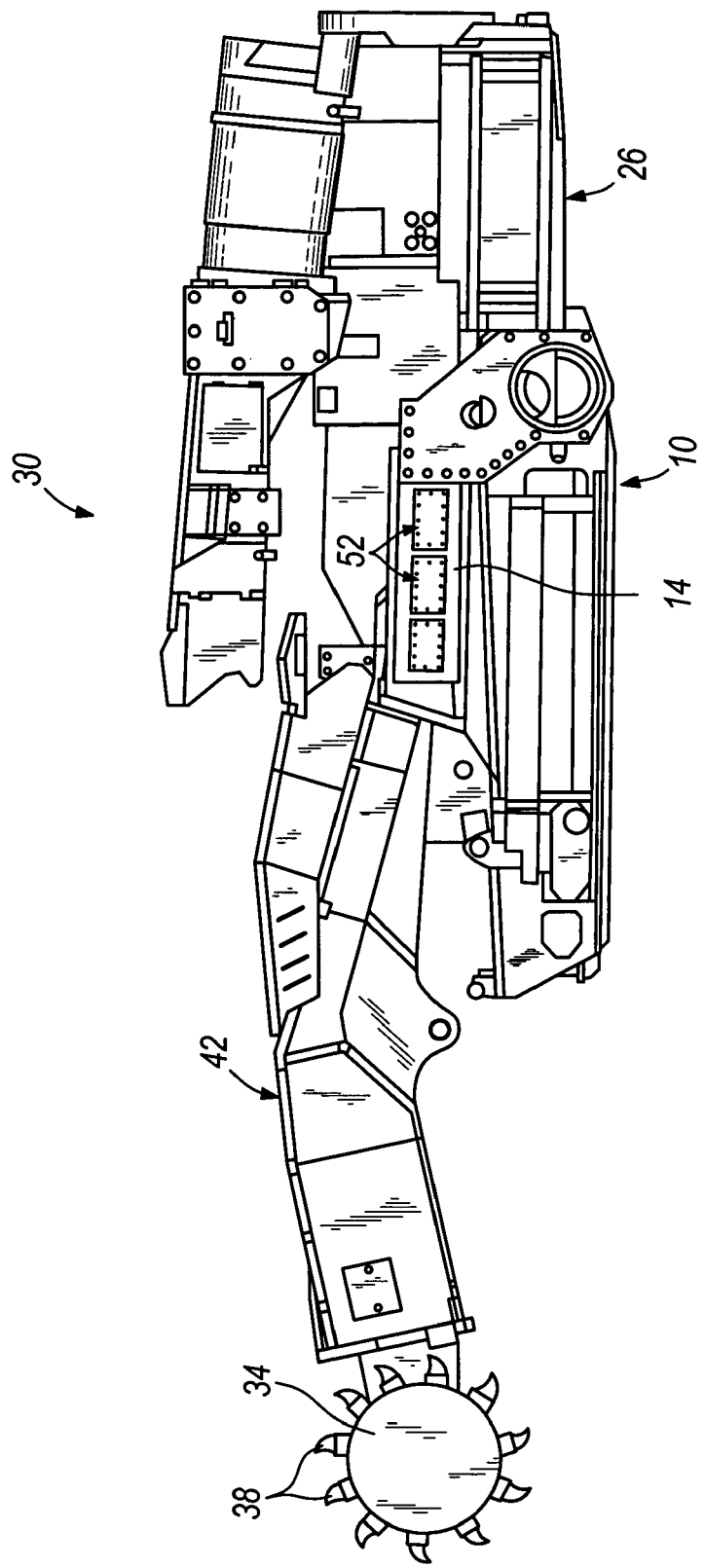
FIG. 5 is a side elevational view of a continuous mining machine including the structural member of this invention.

As illustrated in FIGS. 1 through 5, this invention is directed to an assembly 10 including a structural member 14 that supports a load, the structural member or controller 14 having a rectangular opening 18 therein to a cavity 22 within the structural member 14 that is adapted to house electrical components 23 therein. More particularly, in the preferred embodiment, the structural member 14 is part of the frame 26 of a coal mining apparatus 30.

One type of coal mining apparatus 30 comprises a mobile mining machine that has a rotatable cutting or mining head 34 that is equipped with a plurality of cutting bits 38 adapted to dislodge coal from a seam (not shown). The cutting head 34 is typically attached to a movable boom arrangement 42 that enables the position of the cutting head 34 to be adjusted relative to the mine floor. As the cutting head 34 is rotated and advanced into the seam, the coal is dislodged from the mine face and is received on gathering and conveying apparatuses (not shown) in the mining machine 30. The conveying apparatus discharges the mined coal onto a separate freestanding or mobile conveying apparatus (not shown) for eventual transfer out of the mine.

As mentioned earlier, the assembly 10 includes the structural member 14 or frame that supports a load. In this embodiment, the load is the cutter head 34. Still more particularly, the frame 14 has multiple rectangular openings 18 therein to the cavity within the frame 14. There is a plurality of holes 46 (taped M16 holes in the preferred embodiment) in the frame 14 and spaced apart completely around and outside of the opening 18. The mining apparatus 30 also includes a plurality of covers 52, one for each opening 18, each cover 52 including a plate 56 with an area larger than the opening 18, the plate 56 having a first surface or face 60 and an opposite second surface 64.

Each cover 52 includes the lip 68 attached to and protruding from the second surface 64, the lip 68 extending over and around and enclosing an area of the second surface 64 and defining a protrusion that, when the cover 52 is laid over the opening 18, it fits intimately within the opening 18. If desired, in other embodiments (not shown), the cover can include open sections replaced with glass to allow for visibility through the cover. In still other embodiments (not shown), the cover can be made from a hard transparent plastic. In still another embodiment (not shown), there can be one plate that covers all of the openings 18, with a plurality of lips, one for each opening, on the plate. Although in the preferred embodiment the lip 68 is in the form of a solid piece flange, in other embodiments (not shown), the lip can be formed from a projection of sufficient width to provide the needed structural rigidity to reduce screw damage, as further explained below.

The cover 52 also includes a plurality of plate clearance holes 72 (see FIGS. 2 and 4), in the plate 56 and spaced apart completely around and outside of the lip 68. When the cover 52 is laid over the opening 18 the holes 72 of the plate 52 line up with holes 46 of the structural member 14. The mining apparatus 30 also includes a plurality of means for attaching the cover 52 to the frame 14 in the form of screws 76 (M16×60 screws in the preferred embodiment) 76, with each screw 76 received in a respective one of the plate clearance holes 72 and received in a respective one of the member tap holes 46 so that the head of the screw is on the first surface 60 of the plate 56. In other embodiments (not shown), the head could be counter bored into the cover 52 if desired. Thus, although in this embodiment the clearance holes 72 and tap holes 46 are threaded, in other embodiments (not shown), a bolt with its head fastened to the inside of the frame 14, with a nut on the end of the bolt outside of the frame, can be used.

The cover 52 with the lip 68 that protrudes from the internal side of the cover 52 into the opening 18 in the case or frame 14 helps to prevent screw problems. The cover 52 and case fairly precise fit into the opening 18. It is not necessary to have a metal to metal pilot fit when the cover 52 is installed. It simply must be close enough to allow just a small amount of defection of the case 14 before the cover 52 begins to carry load. As the controller case 14 deflects, the cover 52 becomes tight in the opening 18 and the cover 52 takes load, thus dramatically improving the rigidity of the system and reducing failure of the cover fastening screws 76.

Various other features and advantages of the invention will be apparent from the following claims.

The invention claimed is:

1. An assembly including a structural member that supports a load, said structural member having an opening therein to a cavity within said structural member that is adapted to house electrical components therein, said structural member opening being defined by a perimeter surface, and a plurality of opening holes in said structural member and spaced apart completely around and outside of said opening, a cover for said opening, said cover including a plate with an area larger than said opening, said plate having a first surface and an opposite second surface, a lip attached to and protruding from said second surface, said lip extending around and enclosing an area of said second surface and defining a protrusion that, when said cover is laid over said opening, fits closely within said opening, said protrusion having a surface that lies adjacent and parallel to the entirety of said opening surface, and a plurality of plate holes, in said plate and spaced apart completely around and outside of said opening when said cover is laid over said opening, and a plurality of means for attaching the cover to the structural member, with each attaching means received in a respective one of said plate holes and received in a respective one of said member holes so that said attaching means is on the first surface of said plate.

2. An assembly in accordance with claim 1 wherein said opening is rectangular.

3. An assembly including a structural member that supports a load, said structural member having a rectangular opening therein to a cavity within said structural member that is adapted to house electrical components therein, said structural member opening being defined by a perimeter surface, and a plurality of opening screw holes in said structural member and spaced apart completely around and outside of said opening, a cover for said opening, said cover including a plate with an area larger than said opening, said plate having a first surface and an opposite second surface, a lip attached to and protruding from said second surface, said lip extending over and around and enclosing an area of said second surface and defining a protrusion that, when said cover is laid over said opening, fits closely within said opening, said protrusion having a surface that lies adjacent and parallel to the entirety of said perimeter surface, and a plurality of plate screw holes, in said plate and spaced apart completely around and outside of said opening when said cover is laid over said opening, and a plurality of screws, each screw having a head, with each screw received in a respective one of said plate screw holes and received in a respective one of said member screw holes so that the head of said screw is on the first surface of said plate.

* * * * *